United States Patent

Chatterjee et al.

[11] Patent Number: 5,985,984
[45] Date of Patent: Nov. 16, 1999

[54] FORMALDEHYDE FREE GUANAMINE RESIN FOR LITHOGRAPHIC ENERGY CURABLE INKS

[75] Inventors: Subhankar Chatterjee, Hampton; Joseph M. Laquidara, Westwood; Albert A. Kveglis, Pine Brook; Bhalendra J. Patel, Kendall Park, all of N.J.

[73] Assignee: Sun Chemical Corporation, Fort Lee, N.J.

[21] Appl. No.: 09/111,673

[22] Filed: Jul. 8, 1998

[51] Int. Cl.⁶ ............... C08J 3/00; C08K 3/20; C08L 75/00; C08G 18/28
[52] U.S. Cl. ........ 524/589; 106/31.13; 523/160; 523/161; 528/44; 528/52; 528/68; 528/73
[58] Field of Search ............ 524/589; 523/160, 523/161; 528/44, 52, 68, 73; 106/20 R, 31.13

[56] References Cited

U.S. PATENT DOCUMENTS

| | | | |
|---|---|---|---|
| 4,276,405 | 6/1981 | Koleske et al. | 528/58 |
| 4,399,242 | 8/1983 | Fower et al. | 523/404 |
| 4,794,147 | 12/1988 | Savino et al. | 525/440 |
| 4,818,780 | 4/1989 | Murray et al. | 524/430 |
| 5,227,414 | 7/1993 | Ernst et al. | 523/417 |
| 5,369,152 | 11/1994 | Naderhoff et al. | 523/415 |

FOREIGN PATENT DOCUMENTS

| | | | |
|---|---|---|---|
| 0 315 164 A2 | 5/1989 | European Pat. Off. | C08G 59/50 |
| 0318 962 A2 | 6/1989 | European Pat. Off. | C08L 63/10 |
| 0 327 129 A1 | 8/1989 | European Pat. Off. | C09D 3/58 |
| 0 469 550 A2 | 2/1992 | European Pat. Off. | C08G 59/44 |
| 0 580 163 A1 | 1/1994 | European Pat. Off. | C09D 133/06 |
| 1 599 214 | 9/1981 | United Kingdom | C09K 3/58 |
| WO 89/10380 | 11/1989 | WIPO | C08K 5/00 |

*Primary Examiner*—Patrick D. Niland
*Attorney, Agent, or Firm*—Sidney Persley

[57] ABSTRACT

A composition comprising a condensation resin of the formula:

$$R^1\text{-}A\text{-}Z[\text{-}A\text{-}Z'\text{-}]_n\text{-}R^2$$

wherein each A has the structure:

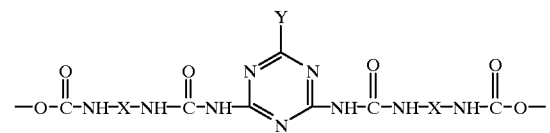

and Y is a phenyl group or a methyl group; X is an alkylene group or an arylene group; $R^1$ and $R^2$ are each individually a $C_4$–$C_{13}$ alkyl group, $C_4$–$C_{12}$ alkyl group substituted with 1 or more hydroxy groups, or a combination thereof; n is 0, 1, or 2 provided that, when n is 0, then Z is a covalent bond, and when n is 1 or 2, then Z is a $C_4$–$C_{13}$ alkylene group which is unsubstituted or substituted with 1 or more hydroxy groups; and Z' is the same as Z, a covalent bond or a derivative of the condensation resin. Along with an ink formulation comprising. The composition and method for preparing the above condensation resin having an increased softening temperature.

37 Claims, No Drawings

FORMALDEHYDE FREE GUANAMINE RESIN FOR LITHOGRAPHIC ENERGY CURABLE INKS

FIELD OF THE INVENTION

This invention relates to ultraviolet (UV) or electron beam (EB) curable inks and coatings which contain benzoguanamine resins.

DESCRIPTION OF RELATED ART

Conventional ultraviolet or electron beam (hereinafter identified as UV/EB) curable inks and coatings are comprised of ethylenically unsaturated oligomers and monomers which upon exposure to light of suitable wavelengths and in presence of suitable photoinitiators, polymerizes to form a hard film with desired properties. In some applications, attempts have been made to replace or minimize oligomers by substituting suitable hard resins. However, selection of these resins is tricky as such resins must have the appropriate molecular weight; must form a homogeneous and stable varnish with acrylated monomers and above all must be compatible with a host of other ingredients present in a UV/EB ink or coating. Due to mismatch of polarities with acrylates, a wide variety of resin systems used in the conventional inks and coatings industry do not fulfill these characteristics. Benzoguanamine resins widely used in a variety of industries, are one of the resins systems that come close to meeting these requirements.

Melamine resins, such as benzoguanamine resins, are used in adhesives, varnishes, binders for organic dyes and pigments etc. to offer improved flow, adhesion, compatibility and gloss. These resins are made by reacting the amine with formaldehyde to give the corresponding hydroxyalkyl derivatives. For example, conventional benzoguanamine resin is produced by the condensation reaction between benzoguanamine and formaldehyde to produce the corresponding hydroxyl derivative which is further etherfied with a suitable alcohol, e.g., n-butanol. Alone or as co-condensates with urea, phenol etc. these hydroxyalkyl derivatives or their ethers, offer resins with the desired properties. However, the principal shortcoming of these resins is their slow decomposition or autocondensation to produce one of the starting raw materials, formaldehyde, and its associated release into the environment. Since formaldehyde has been labeled as a carcinogen, its release into the environment by such resins imposes a significant limitation on their use in commercial products.

Although benzoguanamine resins are useful in formulating UV/EB curable inks and coatings, there is a need to remove the undesired formaldehyde emission problem while retaining all of the desired properties offered by the standard benzoguanamine resin.

SUMMARY OF THE INVENTION

The above described need is met by the invention which is a composition comprising a condensation resin of the formula:

wherein each A has the structure:

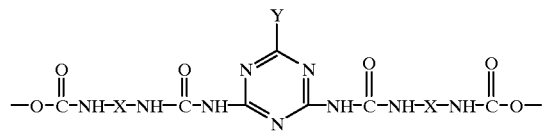

wherein Y is a phenyl group or a methyl group; X is an alkylene group or an arylene group; $R^1$ and $R^2$ are each individually a $C_4$–$C_{13}$ alkyl group, $C_4$–$C_{13}$ alkyl group substituted with 1 or more hydroxy groups, or a combination thereof; n is 0, 1, or 2 provided that, when n is 0, then Z is a covalent bond, and when n is 1 or 2, then Z is a $C_4$–$C_{13}$ alkylene group which is unsubstituted or substituted with 1 or more hydroxy groups; and Z' is Z, a covalent bond or a derivative of the condensation resin.

Another embodiment of this invention is an ink comprising: (1) a pigment; (2) a vehicle comprising a condensation resin of the formula:

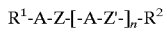

wherein each A has the structure:

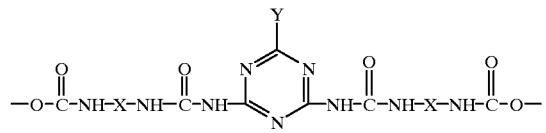

wherein Y is a phenyl group or a methyl group; X is an alkylene group or an arylene group; $R^1$ and $R^2$ are each individually a $C_4$–$C_{13}$ alkyl group, $C_4$–$C_{13}$ alkyl group substituted with 1 or more hydroxy groups, or a combination thereof; n is 0, 1 or 2 provided that, when n is 0, then Z is a covalent bond, and when n is 1 or 2, then Z is a $C_4$–$C_{13}$ alkylene group which is unsubstituted or substituted with 1 or more hydroxy groups; Z' is Z or a covalent bond; or a derivative of the condensation resin; and (3) a liquid diluent.

A further embodiment of this invention is a method for preparing a benzoguanamine resin comprising, in the order given, the steps: (a) combining equimolar portions of benzoguanamine and a $C_4$–$C_{13}$ alkanol in a dimethylformamide solvent; (b) adjusting temperature to between about 65° C. and about 85° C. to form a heated benzoguanamine solution; (c) adding to the heated benzoguanamine solution, a bimolar portion of a diisocyanate compound having isocyanate groups with differing degrees of reactivity, wherein the bimolar portion is based on the equimolar portion of benzoguanamine, and heating to a temperature between about 100° C. and about 125° C. for a first period of time to form a first intermediate solution; (d) adding to the first intermediate solution, a second equimolar portion of the alkanol and heating the solution to a temperature of about 130° C. to about 160° C. for a second period of time to form a second intermediate solution containing a benzguanamine resin having a first softening temperature; and (e) removing the dimethylformamide solvent from the second intermediate solution by distillation at a temperature of about 210° C. to about 240° C. to form a modified benzguanamine resin having a second increased softening temperature relative to the first softening temperature of the benzguanamine resin.

DETAILED DESCRIPTION OF THE INVENTION

The present invention is directed to a novel guanamine resins which can be made without the incorporation of any aldehyde. For example, benzoguanamine resin is made as 'benzoguanamine polyurethane.' The guanamine resins of this invention are a condensation resins of the formula:

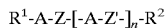

wherein each A has the structure:

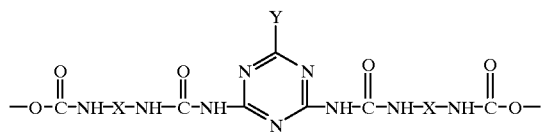

Y may be a methyl group or preferably a phenyl group. X may be an alkylene group or an arylene group such as a residue of a compound selected from the group of toluene, diphenylmethane, naphthalene, n-hexane cyclohexane, and isophorone. Preferably, X is 3-methylene-3,5,5-trimethyl-cyclohexyl. Each $R^1$ and $R^2$ are each individually may be a $C_4$–$C_{13}$ alkyl group, $C_4$–$C_{13}$ alkyl group substituted with 1 or more hydroxy groups, or a combination thereof. Typically $R^2$ is the same as $R^1$. $R^1$ and/or $R^2$ may be a combination of a $C_{12}$–$C_{13}$ alkyl group and a dimethylol butyl group. $R^1$ and/or $R^2$ may be a n-butyl group, a $C_{12}$–$C_{13}$ alkyl group, a di-hydroxyhexyl group or a combination thereof. Preferably $R^1$ is a n-butyl group. The integer n may be 0, 1 or 2 provided that when n is 0, then Z is a covalent bond, and when n is 1 or 2, then Z is a $C_4$–$C_{13}$ alkylene group which is unsubstituted or substituted with 1 or more hydroxy groups, e.g., a methylolpentylene group, Z' may be the same as Z or a covalent bond.

In a preferred guanamine resin of this invention, n is 0; $R^1$ and $R^2$ are each individually is a n-butyl group; Y is a phenyl group; and X is 3-methylene-3,5,5-trimethyl-cyclohexyl.

In another preferred guanamine resin of this invention, n is 1 or 2; $R^1$ is a $C_{12}$–$C_{13}$ alkyl group; Z is a methylol pentylene group; Y is a phenyl group; X is 3-methylene-3,5,5-trimethyl-cyclohexyl; and $R^2$ is a $C_4$–$C_{13}$ alkyl group, a di-hydroxyhexyl group, or a combination thereof.

The guanamine resin may also be a derivative of the condensation resin such as a heat treated derivative resulting from heating the condensation resin at a temperature between about 210° C. and about 240° C. Resins of this invention exhibit excellent film forming properties and excellent pigment wetting properties when formulated as UV/EB inks. Such ink formulations have excellent lithographic properties, e.g., wider water tolerance, which is difficult to achieve with conventional resins systems. Preferred guanamine resins of this invention are benzoguanamine resins and this invention will be illustrated hereinafter in reference to benzoguanamine but is not intended to be limited thereby.

Benzoguanamine resin of this invention is produced by a condensation reaction between benzoguanamine and a suitable di-isocyanate to produce the corresponding hydroxyl derivative which is further etherfied with a suitable alcohol, e.g., n-butanol, to form the benzoguanamine composition described supra. In this reaction, the di-isocyanate is a bridging group between benzoguanamine moieties and the reaction is completed by capping the unreacted di-isocyanate (also referred to herein as isocyanate) functionalities with n-butanol. Suitable di-isocyanates, used in this reaction are di-isocyanates with differing degrees of isocyanate reactivity, e.g., isophorone di-isocyanate, pentanoyl di-isothiocyanate, 1-butanesulfonyl di-isocyanate, and 1,6-hexanedisulfonyl di-isocyanate. It was discovered that the order of addition of reactants had a significant effect on the resin characteristics (i.e., addition of isocyanate to benzoguanamine in a appropriate solvent, e.g., di-methyl formamide (DMF), followed by n-butanol for capping; as opposed to addition of isocyanate to a mixture of benzoguanamine in DMF and partial amount of n-butanol first, followed by the addition of rest of the n-butanol to cap the remaining isocyanates) such as viscosity, softening point, molecular weight distribution etc., and hence on the properties of the finished UV/EB inks and coatings. It was also found that the heating time before adding the n-butanol (to cap the remaining isocyanate functionalities at the end) had a similar effect on the resulting resin properties. This particular tool of controlling the finished resin properties by judicious control of the amount and time of n-butanol in addition in the beginning and at the end of the reaction sequence, respectively, makes the reaction scheme versatile. Thus, a single reaction can lead to a series of resins having a wide range of properties and applications. By way of illustration the benzoguanamine resin may, for example, be prepared in accordance with the following reaction scheme:

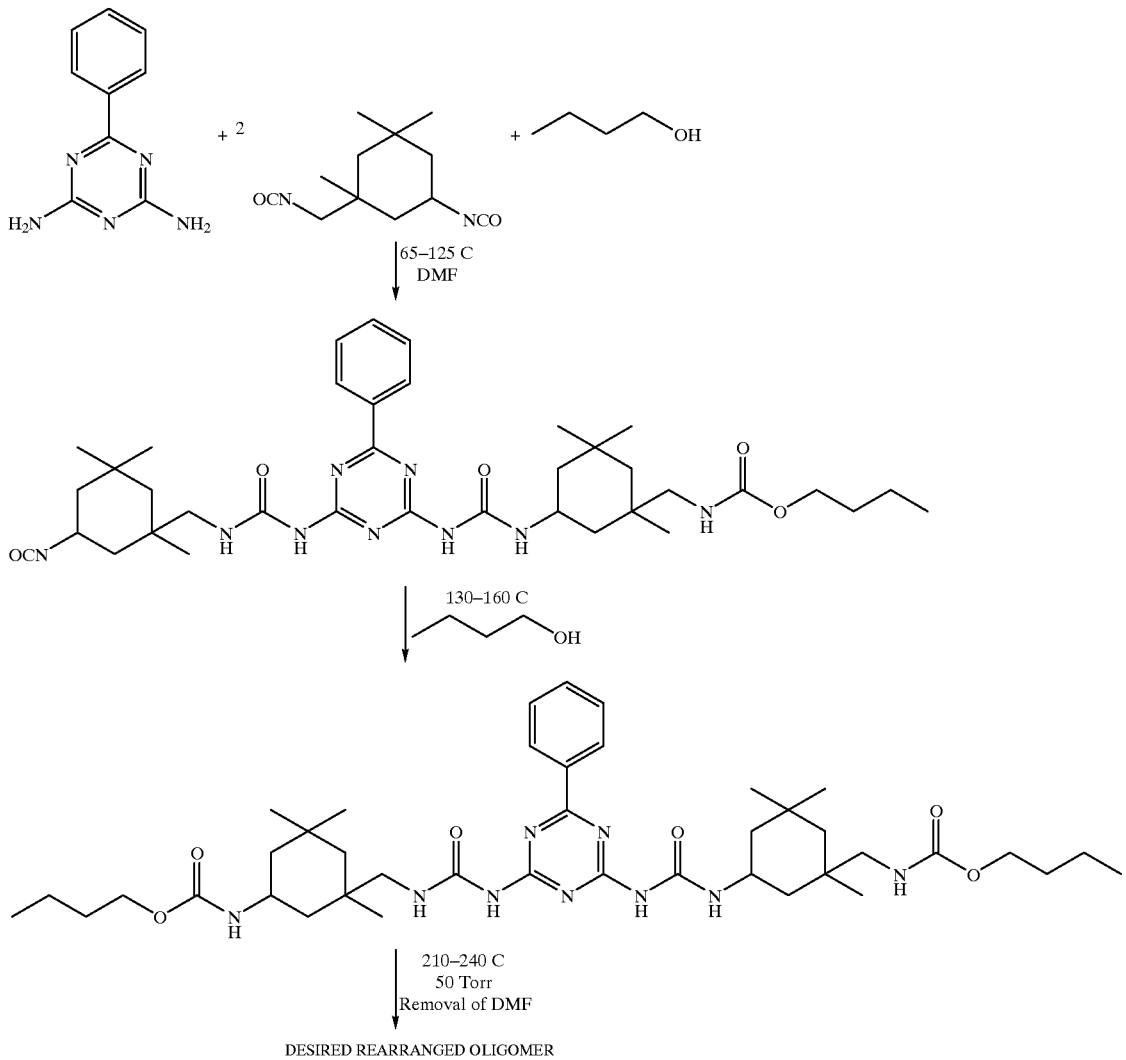

DESIRED REARRANGED OLIGOMER

Accordingly, the method for preparing benzoguanamine resins of the present invention comprises, in the order given, the steps: (a) combining equimolar portions of benzoguanamine and a $C_4$–$C_{13}$ alkanol in a dimethylformamide solvent; (b) Adjusting the temperature to between about 65° C. and about 85° C. to form a heated benzoguanamine solution; (c) adding a bimolar portion of a diisocyanate compound having isocyanate groups with differing degrees of reactivity to the heated benzoguanamine solution, in which the bimolar portion is based on the equimolar portion of benzoguanamine, and heated to a temperature between about 100° C. and about 125° C. for a first period of time to form a first intermediate solution; (d) adding a second equimolar portion of the alkanol to the first intermediate solution, and the solution is heated to a temperature of about 130° C. to about 160° C. for a second period of time to form a second intermediate solution containing a benzguanamine resin having a first softening temperature; and (e) removing the dimethylformamide solvent from the second intermediate solution by distillation at a temperature of about 210° C. to about 240° C. to form a modified benzguanamine resin which has a second increased softening temperature relative to the first softening temperature of the benzguanamine resin.

In this method the $C_4$–$C_{13}$ alkanol may be n-butanol, a $C_{12}$–$C_{13}$ alkanol, or a combination thereof, of which n-butanol is preferred. The $C_4$–$C_{13}$ alkanol may also contain a polyol compound containing two or more hydroxy groups, such as trimethylol propane. When a polyol compound is present, it is typically used in combination with a monohydroxy alkanol such as n-butanol. Diisocynate compounds which are useful in the method of this invention include isophorone di-isocyanate, pentanoyl diisothiocyanate, 1-butanesulfonyl diisocyanate, and 1,6-hexanedisulfonyl diisocyanate of which isophorone di-isocyanate is preferred.

In the method of this invention the first period of time may be determined analytically as the time when the concentration of the isocyanate groups is between about 40 and about 20 mole % based on the moles present in the bimolar portion of the diisocyanate compound. Similarly, the second period of time may be determined analytically as the time when the concentration of the isocyanate groups is between about 1 and about 0 mole % based on the moles present in the bimolar portion of the diisocyanate compound. During step (d) and after the heating for the second period of time, a crosslinking agent may be added and heating is continued for a third period of time at temperatures of about 160° C. During step (e) the dimethylformamide solvent may be removed from the second intermediate solution first by distillation at a temperature of about 210° C.; and then by vacuum distillation at a temperature to about 240° C.

The compositions of this invention may also contain a colorant, a liquid component, or a combination thereof, in addition to the guanamine component. Such compositions typically are coating liquids, inks, and the like. As used herein, the term "colorant" is intended to include any additive which alters the visual appearance of the composition such as dyes, pigments, fluorescing agents, matting agents, and the like. The liquid may be a solvent such as water, organic liquids, or a combination thereof. The liquid may also be an energy curable liquid such as a condensation polymerizable composition or a free radical, addition polymerizable system. As used herein, the term "energy curable" liquid is intended to mean that the liquid is cured by thermal energy from a conductive or radiant heat source, such as an infrared (IR) laser, or by actinic radiation such as EB radiation, UV radiation, and the like. The free radical, addition polymerizable system typically comprises an oligomer, a polymer or a combination thereof, and an ethyleneically unsaturated monomeric diluent which may be polymerized with EB radiation. When UV radiation is used to polymerize the liquid, the polymerizable system typically contains a free radical generating addition polymerization initiating system activatable by actinic radiation. Oligomers and monomers suitable for use in the present invention are disclosed in The Printing Ink Manual, Fifth Edition, pgs. 652–660. Particularly useful oligomers and monomers include acrylates, methacrylates, allyls, styrenyls and vinyls. In addition to the colorant and liquid components the composition may contain additional adjuvants such as dispersing agents coating aids, viscosity modifiers, and the like, to further modify the composition or the product derived therefrom.

A particularly preferred guanamine composition of this invention is an ink which comprises: (1) a pigment; (2) a vehicle comprising a condensation resin having the formula: $R^1$-A-Z-[-A-Z'-]$_n$-$R^2$ wherein each A has the structure defined supra; and (3) a liquid diluent.

The pigment may be any colorant conventionally used in the manufacture of inks. Suitable pigments for use in ink formulations of the present invention are disclosed in The Printing Ink Manual, Fifth Edition, pgs. 141–199.

In addition the vehicle of the guanamine condensation resin may contain an energy curable component such as an oligomer, a monomer, or a combination thereof.

The liquid diluent may be a fugitive solvent, an energy curable liquid, or a combination thereof. As used herein, the term "fugitive solvent" mean any aqueous or organic solvent which is removed from the printed ink, such as by evaporation, imbition or the like, to leave a dry printed image. Fugitive solvents include conventional ink solvents such as water, hydrocarbon solvents, alcohols, glycols, ketones, esters and mixtures thereof.

When the vehicle and/or the liquid diluent are energy curable, the energy curable component or liquid may be an ethylenically unsaturated compound capable of undergoing free radical addition polymerization. Suitable energy curable liquid diluents are described in The Printing Ink Manual, Fifth Edition, pg. 286 and include tripropylene glycol diacrylate (TPGDA), 1,6-hexanediol diacrylate (HDDA) and trimethylol propane triacrylate (TMPTA), n-vinyl pyrrolidone, dianol diacrylate (DDA) and glyceryl propoxy triacrylate (GPTA).

Such energy curable component or liquid may also contain a polymerization initiating system activatable by actinic radiation. Suitable photoinitiators are described in The Printing Ink Manual, Fifth Edition, pgs. 286–87 and include benzophenone, 4,4-bis dimethylamino benzophenone (Michler's ketone), benzil, derivatives of benzophonone, thioxanthones, benzil ketals, acetophenone derivatives and combinations thereof. The ink compositions of this invention may contain other adjuvants to facilitate the printing process used on the printing stock to be printed, and to improve the quality of the final printed ink image. Such adjuvents include a surface active agent, a wax, or a combination thereof. Any conventional surface active agent may be used to aid in dispersing the pigment in the ink and in wetting the print stock with the ink. Suitable surface active agents for use in the present invention are described in The Printing Ink Manual, Fifth Edition, pg. 312 and include anionic surfactants such as fatty acid salts; cationic surfactants such as quarternary ammonium salt; non-ionic surfactants such as polyethoxylated nonylphenol; and amphoteric surfactants such as alkyldimethylbetaine. Any wax conventionally used in ink formulation may be used. Suitable waxes for use in the present invention are described in The Printing Ink Manual, Fifth Edition, pgs. 265–73 and include synthetic waxes, petroleum waxes and natural waxes.

The benzoguanamine resin of this invention can be used to make an ink system both by grinding dry pigment into it or by flushing the pigment presscake into it. In a typical manufacturing procedure for Inks, the required amount of dry pigment is mixed with the benzoguanamine resin of this invention on a mixer for 15–30 minutes. The dispersed pigment is then ground on a three roll mill until the desired grind specifications are met. The let down vehicle (i.e. varnish), photoinitiator(s) and additive(s), e.g., wax, talc etc., are then added to this 'mill base' and passed over the three roll mill once or twice. The 'tack' of this almost finished ink is checked on an inkometer and adjusted by adding appropriate amounts of monomer(s) to finish the ink. A typical ink formulation prepared by the dry grind method contains the following components:

| Component | Avg. Wt. % |
| --- | --- |
| Benzoguanamine resin | 25.0 |
| Acrylated Oligomers | 10.0 |
| Pigment(s) | 17.0 |
| Let Down Vehicle | 30.0 |
| Monomer(s) | 8.0 |
| Photoinitiator(s) | 5.0 |
| Additive(s) | 5.0 |

When starting from a flush, the flush is mixed directly with the let down vehicle, oligomers, photoinitiator(s) and the additives. This mixture is then given a canning pass over a three roll mill; tack is checked and adjusted appropriately with monomer(s) to finish the ink. A typical ink formulation prepared from the pigment flush contains the following components:

| Component | Avg. Wt. % |
| --- | --- |
| Pigment Flush | 50.0 |
| Acrylated Oligomers | 10.0 |
| Let Down Vehicle | 30.0 |
| Photoinitiator(s) | 5.0 |
| Additive(s) | 5.0 |

In this instance the pigment flush contains about 10 weight % of the benzoguanamine resin of this invention.

A typical energy curable ink formulations prepared from the benzoguanamine of this invention contain the following components:

| Component | UV INK Avg. Wt. % | EB INK Avg. Wt. % |
|---|---|---|
| Benzoguanamine resin | 24 | 25 |
| Inhibitor | 2 | 2 |
| Epoxy acrylate oligomer | 7 | 9 |
| Let down vehicle | 34 | 36 |
| Pigment | 17 | 17 |
| Photoinitiator(s) | 5 | — |
| Tack reducer (monomer) | 7 | 7 |
| Other additives | 4 | 4 |

Typically radiation curable inks of this invention have a tack at 1200 rpm of between 13–21 depending on the amount of tack reducer used in the formulation. Typical rheological properties of these radiation curable inks are a Haake #4 viscosity between 4.4–8.4; a maximum Ostwald B viscosity of 0.87; and a Yield Value between 250–1300.

The guanamine compositions of this invention will now be illustrated by the following examples but is not intended to be limited thereby. Unless otherwise indicated, the % isocyanate (NCO) groups and softening point were determined in these examples as follows:

Determining the Isocyanate Groups

In this procedure, a known weight of resin, containing free isocyanate (NCO) groups is reacted with dibutyl amine.

Reagents:
0.1N dibutyl amine (DBA)—12.92 g dibutyl amine (99%) and the 1000 ml volumetric balance being toluene (99%).
0.1N HCl
Isopropanol (anhydrous)
Indicator—0.1 g bromophenol blue dissolved in 100 ml of 20% aqueous methanol.

Procedure:

About 0.2 g of resin sample is added to 10 ml of dibutyl amine solution. The resin is then dissolved with gentle heating and cooled. Next, 25 ml of isopropanol is added along with 4 drops of indicator. The solution is titrated against standardized HCl until there was a color change from blue to yellow. The volume of HCl used and was recorded. The blank was run using the same procedure but omitting the resin.

Calculation:

Normality of dibutyl amine ($N_{DBA}$)

$$N_{DBA} = \frac{(0.1\ N_{HCl})(\text{vol HCl from step 6})}{10\ \text{ml DBA}}$$

$$\text{NCO Eq} = \frac{(N_{DBA})(10\ \text{ml}) - (0.1\ N_{HCl})(\text{vol HCl from step 5})}{1000}$$

$$\%\ \text{NCO} = \frac{(\text{NCO Eq}) \times 42 \times 100}{(\text{sample weight from step 1})(0.60)}$$

Softening Point Determination

Determination of softening point of hard resins via Durrans Mercury Method. Values obtained with this method are comparable to those obtained by the Ring and Ball method.

Procedure:

3 grams of resin was melted. After the resin is allowed to cool to room temperature, 50 g of mercury was added. The contents were heated to effect a temperature rise of 2° C./min. The temperature at which the resin first appears above the surface of the mercury is taken as the softening or melting point.

As illustrated in the following examples, the benzoguanamine resin (or oligomer) is prepared in two stages. The first stage involves the reaction of benzoguanamine with a diisocynate and an alcohol in dimethylformamide (DMF) to form the resin. The second stage involves the removal of DMF by heating under vacuum and the resultant formation of a higher softening point oligomer by a secondary reaction that involves the formation and reaction of new isocyanate species. The benzoguanamine oligomer may properly be identified generically as a poly(urea-urethane).

Those skilled in the art having the benefit of the teachings of the present invention as hereinabove set forth, can effect numerous modifications thereto. These modifications are to be construed as being encompassed within the scope of the present invention as set forth in the following examples and appended claims.

EXAMPLE 1

A benzoguanamine oligomer with a modification in structure was prepared in two stages as follows and a varnish prepared from the modified oligomer.

Stage 1

95.2 g of dimethyl formamide (DMF), 38.4 g (0.21 moles) of benzoguanamine, and 15.2 g (0.21 moles) n-butanol were mixed under a nitrogen blanket (sparge). The mixture was heated slowly under agitation and held at 80–85° C. until the benzoguanamine was fully dissolved. Next, 91.2 g (0.42 moles) isophorone diisocyanate was added over 45 minutes. The batch was then heated slowly to 100° C. over 30 minutes, then similarly to 110° C. and 120° C. over 30 minutes, respectively. At 120° C., the batch was held for 1112 hours to obtain a value of 8.7% free isocyanate (see isocyanate determination procedure). 15.2 g (0.21 moles) n-butanol was quickly added to the batch and the batch again was heated to about 125° C., until the % free isocyanate equaled 1.9% (approximately 1112 hours). Next, 0.04 g of dibutyltin dilaurate was added and the batch was again heated to about 160° C., until the % free isocyanate equaled 0.8% (approximately 2½ hours). At this point, the oligomer was complete and the remaining isocyanate groups were quenched with 3 g n-butanol. Infrared analysis revealed no isocyanate peak.

Stage 2

The batch was heated and stirred to recover DMF at 170–210° C. After the majority of the DMF distillate came over, the batch was vacuum distilled at 50–125 Torr and 220±20° C. for 3 hours. Afterwards, the vacuum was released and an aliquot gave a softening point of 137° C., which was desired for the ink application (see softening point procedure).

To prepare a varnish, 39.2 g of an adduct of pelargonic acid with a $C_{12}$–$C_{14}$ alkyl glycidyl ether was added followed by 0.16 g of 4-methoxyphenol. The batch was cooled to 140° C., then the nitrogen was replaced with air. At 130° C., 120.7 g of tripropylene glycol diacrylate was added while the batch was brought to a temperature of 90–95° C. and held at this temperature until the resin was fully dissolved (approximately 1 hour). The resultant varnish was clear amber in color, with a Haake VT-500 viscosity of 7.8 Pa·S@60° C.

EXAMPLE 2

A benzoguanamine oligomer with a modification in structure was prepared in two stages as follows and a varnish prepared from the modified oligomer.

Stage 1

172 g of DMF, 69.3 g (0.37 moles) of benzoguanamine, 8 g (0.06 moles) of trimethylolpropane, and 53.7 g (0.28 moles) of a $C_{12}$–$C_{13}$ aliphatic alcohol were mixed as in Example 1. The mixture was heated under nitrogen with agitation until the benzoguanamine was dissolved, then the mixture was brought to 75° C., whereupon 164.7 g (0.74 moles) of isophorone diisocyanate was added over 30 minutes at a temperature of 75–80° C. The contents was then heated slowly to 100° C.

At 100° C., the batch was held for about 1.5 hours to obtain a value of 6.2 for the % of free isocyanate . Quickly, 26.4 g (0.14 moles) of $C_{12}$–$C_{13}$ aliphatic alcohol and 10.2 g (0.14 moles) of n-butanol were added and the contents was heated to 130° C. until the % of free isocyanate was 0.7. Next, 0.01 g of dibutyltin dilaurate was added and the contents was heated to 160° C. until infrared analysis revealed no isocyanate peak (about 30 minutes).

Stage 2

The same procedure as in Example 1 was used to recover the DMF. At 200° C. the batch was placed under a reduced pressure of 50–125 Torr for 30 minutes. An aliquot of the material gave a softening point of 100° C. (Ring and Ball Method). One hour later a softening point of 103° C. was recorded; 75 minutes later, a value of 109° C. was obtained, and one hour later, a final softening point of 115° C. was recorded. The vacuum was released and the contents was brought to 155° C. 0.3 g of 4-methoxyphenol was added and the batch further cooled to 140° C. at which point the nitrogen was replaced with air. At 130° C., 221 g of tripropylene glycol diacrylate was added while the contents was brought to a temperature of 90–95° C. and held at this temperature until the resin was fully dissolved (about 30 minutes). The resultant varnish was a clear amber color, with a Haake VT-500 viscosity of 2.7 Pa·S@60° C.

EXAMPLE 3

A varnish containing the benzoguanamine oligomer of this invention was prepared with a poly(urethane-urea) oligomer having the components:

|   | Component | Parts by Weight |
|---|-----------|-----------------|
| A | Benzoguanamine | 24.0 |
| B | Dimethyl Formamide (DMF) | 59.5 |
| C | n-Butanol | 9.49 |
| D | Isophorone Diisocyanate | 57.0 |
| E | n-Butanol | 9.49 |
| F | Dibutyl Tin Dilaurate | 0.02 |

Components A and B were combined 10% of component B was distilled off at 160° C. then the mixture was refluxed. The batch was cooled to 85° C. then component C was added. When the batch was at a temperature of 80±3° C., component D was added over 30–60 minutes. The batch was heated slowly to 100° C. over 30 minutes, then heated slowly to 110° C. over 30 minutes while sampling the batch at intervals for % NCO determination. The batch was heated slowly to a maximum of 120° C. over 30 minutes and held at 120° C. until the % NCO was 8.7±0.2. The batch was cooled quickly to 105° C. At 105° C., component E was added and the batch heated to 125° C. and held until the % NCO was less than 3.0. When %NCO was less than 3.0, component F was added and temperature was increased to 160° C. and held until the % NCO was less than 1.0. When the %NCO was less than 1.0, the reaction was monitored by IR analysis by sampling every thirty minutes using the NCO peak at 2280 cm$^{-1}$. When all of the NCO had virtually disappeared, component B was removed by distillation while increasing the temperature to 210° C. When the majority of component B was removed, vacuum distillation was initiated under nitrogen. After the temperature stabilized at 210° C., it was raised to 225±2° C. and held at that temperature for 2 hours. Afterwards, the vacuum was released and the temperature was held at 225±2° C. and the batch sampled periodically for softening point and measurements. When the softening point increased, the resulting benzoguanamine oligomer was used immediately as a molten resin in the preparation of the varnish. The benzoguanamine oligomer had a Gardner viscosity of Z7+1 (50% sol. in Cellosolve acetate).

A varnish was prepared in situ with the benzoguanamine oligomer from the following components:

|   | Component | Parts by Weight |
|---|-----------|-----------------|
| G | Benzoguanamine oligomer | 45.00 |
| H | a $C_{12}$–$C_{14}$ alkyl glycidyl ether | 13.00 |
| I | Hydroquinone monomethyl ether (MEHQ) | 0.08 |
| J | Glyceryl propoxy triacrylate (GPTA) | 41.92 |

To the molten resin prepared in Example 2, i.e., component G, at about 225° C, component H were added and the batch was cooled to 140° C. Then the nitrogen was replaced with air and component I was added at 130° C. Component J was added as quickly as possible. The temperature was adjusted to 90° C. and held for 2 hours, after which the batch was sampled every 30 minutes for viscosity measurements. When the viscosity remained constant, the batch was discharged at 90° C. through a filter bag to produce a varnish. The varnish at room temperature was an amber translucent paste with a "Gardner" color of 8–9 and a Haake viscosity (Eta@~200 1/S@60° C.) of 3–4 Pa·S.

EXAMPLE 4

An ultraviolet UV curable ink formulation may be prepared using the varnish of Example 1 as follows:

| Component | Wt. % Range |
|-----------|-------------|
| Pigment | 15–20 |
| Varnish (Example 1) | 20–35 |
| Monomers/Oligomers | 10–25 |
| Photoinitiator | 5–10 |
| Additives | 1–5 |

As illustrated in the preceding examples, the second stage involves the removal of DMF by heating under vacuum and the resultant formation of a higher softening point oligomer by a secondary reaction that involves the formation and reaction of new isocyanate species. The effects of this heat treatment on the softening point (SP) and molecular weight (M) benzoguanamine resin are illustrated in Table 1 under two reaction conditions. In one set of conditions (A), DMF was removed by heating at 240° C. and 50 TORR. In another set of conditions (B), DMF was removed by heating at 225° C. and 50 TORR. In this table softening point is determined by Durran's mercury method and molecular weights are determined by GPC calibrated with narrow molecular weight polystyrene standards.

TABLE 1

| Sample | Time (min.) | SP (°C.) | Mw | Mn. | Mw/Mn |
|---|---|---|---|---|---|
| A1 | 0 | 132 | 2064 | 1293 | 1.6 |
| A2 | 45 | 140 | 2972 | 1749 | 1.7 |
| A3 | 75 | 153 | 2091 | 1366 | 1.5 |
| A4 | 135 | >195 | 2044 | 1450 | 1.4 |
| B1 | 0 | 132 | 1323 | 899 | 1.5 |
| B2 | 90 | 137 | — | — | — |
| B3 | 180 | 143 | — | — | — |
| B4 | 240 | 150 | — | — | — |
| B5 | 270 | 149 | 1450 | 963 | 1.5 |

Once the desired resin structure or softening point is obtained by this heat treatment step, a varnish can be prepared insitu with a host of different plasticizers and reactive diluents appropriate for the final ink or coating specifications. Some of the vehicles used in energy curable inks of this invention are illustrated in Table 2.

TABLE 2

| | | Viscosity | |
|---|---|---|---|
| Diluent | (Wt. Ratio) | Eta. PaS | (temp) |
| BZP/TPGDA | (50/10) | 7.6–8.9 | (40° C.) |
| BZP/TPGDA | (40/10) | 3.0 | (60° C.) |
| Benzoflex 9-88/TPGDA | (50/10) | 2.5 | (40° C.) |
| Epoxy Pelargonate/TPGDA | (40/10) | 7.8 | (60° C.) |
| GPTA/Heloxy 8 | (40/13) | 8.6 | (60° C.) |
| TPGDA/Heloxy 8 | (50/10) | 1.6 | (40° C.) |
| TPGDA/Heloxy 8 | (28/16) | 38.0 | (40° C.) |

In Table 2, the viscosity was determined using the Haake VT-500 method, at a shear rate of 200 sec$^{-1}$; and BZP is benzophenone, TPGDA is tripropylene glycol diacrylate, GPTA is glycerol propoxy triacrylate, Benzoflex 9–88 is dipropylene glycol dibenzoate, and Heloxy 8 is $C_{12}$–$C_{14}$ alkyl glycidyl ether.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A composition comprising a condensation resin having the formula:

$$R^1\text{-}A\text{-}Z[\text{-}A\text{-}Z'\text{-}]_n\text{-}R^2$$

wherein A has the structure:

—O—C(=O)—NH—X—NH—C(=O)—NH—[triazine ring with Y]—NH—C(=O)—NH—X—NH—C(=O)—O— and Y is a phenyl group or a methyl group; X is an alkylene group or an arylene group; $R^1$ and $R^2$ each individually is a $C_4$–$C_{13}$ alkyl group, a $C_4$–$C_{13}$ alkyl group substituted with 1 or more hydroxy groups, or a combination thereof: n is 0, 1, or 2, wherein, when n is 0, then Z is a covalent bond, and when n is 1 or 2, then Z is a $C_4$–$C_{13}$ alkylene group which is unsubstituted or substituted with 1 or more hydroxy groups, and Z' is Z or a covalent bond; or a derivative of the condensation resin, formed by heat treating the condensation resin at a temperature between about 210° C. and about 240° C.

2. The composition of claim 1 wherein Y is a phenyl group.

3. The composition of claim 1 wherein X is a residue of a compound selected from the group of toluene, diphenylmethane, naphthalene, n-hexane cyclohexane, and isophorone.

4. The composition of claim 1 wherein X is 3-methylene-3,5,5-trimethyl-cyclohexyl.

5. The composition of claim 1 wherein $R^2$ is $R^1$.

6. The composition of claim 5 wherein $R^1$ is a n-butyl group.

7. The composition of claim 5 wherein $R^1$ is a $C_{12}$–$C_{13}$ alkyl group.

8. The composition of claim 1 wherein $R^2$ is a di-hydroxyhexyl group.

9. The composition of claim 1 wherein n is 1 or 2 and Z is a methylol pentylene group.

10. The composition of claim 1 wherein n is 0; $R^1$ and $R^2$ each individually is a n-butyl group; Y is a phenyl group; and X is 3-methylene-3,5,5-trimethyl-cyclohexyl.

11. The composition of claim 1 wherein n is 1 or 2; $R^1$ is a $C_{12}$–$C_{13}$ alkyl group; Z is a methylol pentylene group; Y is a phenyl group; X is 3-methylene-3,5,5-trimethyl-cyclohexyl; and $R^2$ is a $C_4$–$C_{13}$ alkyl group, a di-hydroxyhexyl group, or a combination thereof.

12. The composition of claim 1 further comprising a colorant.

13. The composition of claim 1 further comprising a liquid component.

14. The composition of claim 13 wherein the liquid component is a solvent.

15. The composition of claim 13 wherein the liquid component is an energy curable liquid.

16. The composition of claim 15 wherein the energy curable liquid is a condensation polymerizable composition.

17. The composition of claim 15 wherein the energy curable liquid is a free radical, addition polymerizable system comprising (1) an oligomer, a polymer or a combination thereof, and (2) an ethyleneically unsaturated monomeric diluent.

18. The composition of claim 17 wherein the composition contains a free radical generating, addition polymerization initiating system activatable by actinic radiation.

19. An ink comprising: a pigment; a vehicle comprising a condensation resin having the formula:

$$R^1\text{-}A\text{-}Z[\text{-}A\text{-}Z'\text{-}]_n\text{-}R^2$$

wherein A has the structure:

—O—C(=O)—NH—X—NH—C(=O)—NH—[triazine ring with Y]—NH—C(=O)—NH—X—NH—C(=O)—O— and Y is a phenyl group or a methyl group; X is an alkylene group or an arylene croup; $R^1$ and $R^2$ each individually is a $C_4$–$C_{13}$ alkyl group, a $C_4$–$C_{13}$ alkyl group substituted with 1 or more hydroxy groups, or a combination thereof; n is 0, 1, or 2, wherein, when n is 0, then Z is a covalent bond, and when n is 1 or 2, then Z is a $C_4$–$C_{13}$ alkylene group which is unsubstituted or substituted with 1 or more hydroxy groups, and Z' is Z or a covalent bond; or a derivative of the condensation resin, formed by heat treating the condensation resin at a temperature between about 210° C. and about 240° C.; and (3) a liquid diluent.

20. The ink of claim 19 wherein the liquid diluent is a fugitive solvent.

21. The ink of claim 19 wherein the vehicle further comprises an energy curable component.

22. The ink of claim 21 wherein the energy curable component is an oligomer, a monomer, or a combination thereof.

23. The ink of claim 22 wherein the ink contains a polymerization initiating system activatable by actinic radiation.

24. The ink of claim 22 wherein the energy curable component is an ethylenically unsaturated compound capable of undergoing free radical addition polymerization.

25. The ink of claim 19 wherein the liquid diluent is an energy curable liquid.

26. The ink of claim 25 wherein the energy curable liquid is an ethylenically unsaturated compound capable of undergoing free radical addition polymerization.

27. The ink of claim 26 wherein the energy curable liquid contains a polymerization initiating system activatable by actinic radiation.

28. The ink of claim 19 wherein the ink contains a surface active agent, a wax, or a combination thereof.

29. A method for preparing a benzoguanamine resin comprising, in the order given the steps of: (a) combining equimolar portions of benzoguanamine and a $C_4$–$C_{13}$ alkanol in a dimethylformamide solvent and adjusting temperature to between about 65° C. and about 85° C. to form a heated benzoguanamine solution; (b) adding to the heated benzoguanamine solution, a bimolar portion of a diisocyanate compound having isocyanate groups with differing degrees of reactivity, wherein the bimolar portion is based on the equimolar portion of benzoguanamine, and heating to a temperature between about 100° C. and about 125° C. for a first period of time to form a first intermediate solution; (c) adding to the first intermediate solution, a second equimolar portion of the alkanol and heating the solution to a temperature of about 130° C. to about 160° C. for a second period of time to form a second intermediate solution containing a benzguanamine resin having a first softening temperature; and (d) removing the dimethylformamide solvent from the second intermediate solution by distillation at a temperature of about 210° C. to about 240° C. to form a modified benzguanamine resin having a second increased softening temperature relative to the first softening temperature of the benzguanamine resin.

30. The method of claim 29 wherein the $C_4$–$C_{13}$ alkanol is n-butanol.

31. The method of claim 29 wherein the equimolar portion of the $C_4$–$C_{13}$ alkanol further contains a polyol compound containing 2 or more hydroxy groups.

32. The method of claim 31 wherein the polyol compound is trimethylol propane.

33. The method of claim 29 wherein the diisocyanate compound is isophorone di-isocyanate.

34. The method of claim 29 wherein the first period of time is determined analytically when the concentration of the isocyanate groups is between about 40 and about 20 mole % based on the moles present in the bimolar portion of the diisocyanate compound.

35. The method of claim 29 wherein the second period of time is determined analytically when the concentration of the isocyanate groups is between about 1 and about 0 mole % based on the moles present in the bimolar portion of the diisocyanate compound.

36. The method of claim 29 wherein during step (C) and after the heating for the second period of time, a crosslinking agent is added and eating is continued for a third period of time at temperatures of about 160° C.

37. The method of claim 29 wherein during step (D) the dimethylformamide solvent is removed from the second intermediate solution first by distillation at a temperature of about 210° C.; and then by vacuum distillation at a temperature to about 240° C.

* * * * *